July 7, 1925.
C. G. TROSIEN
AUTOMOBILE LOCK
Filed Dec. 27, 1920
1,545,218
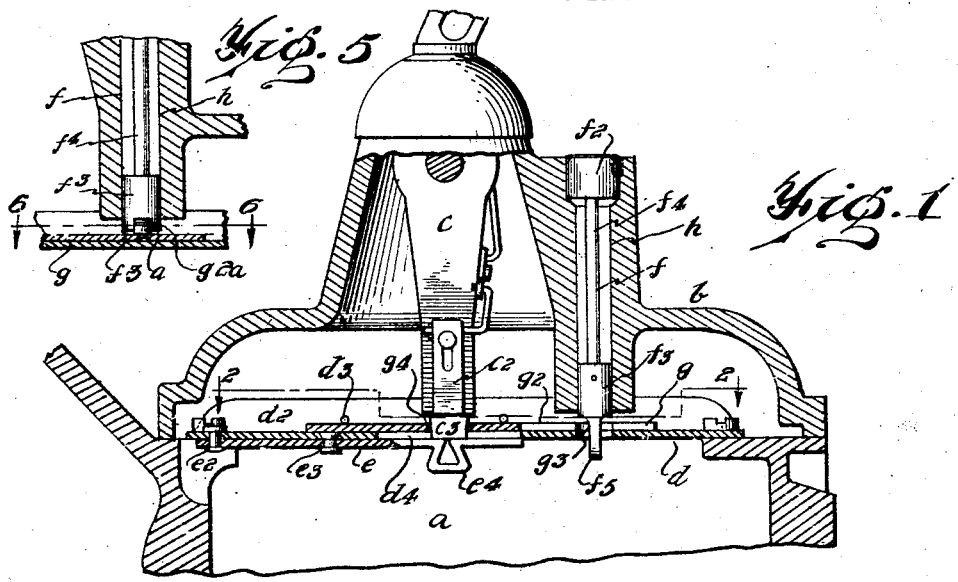
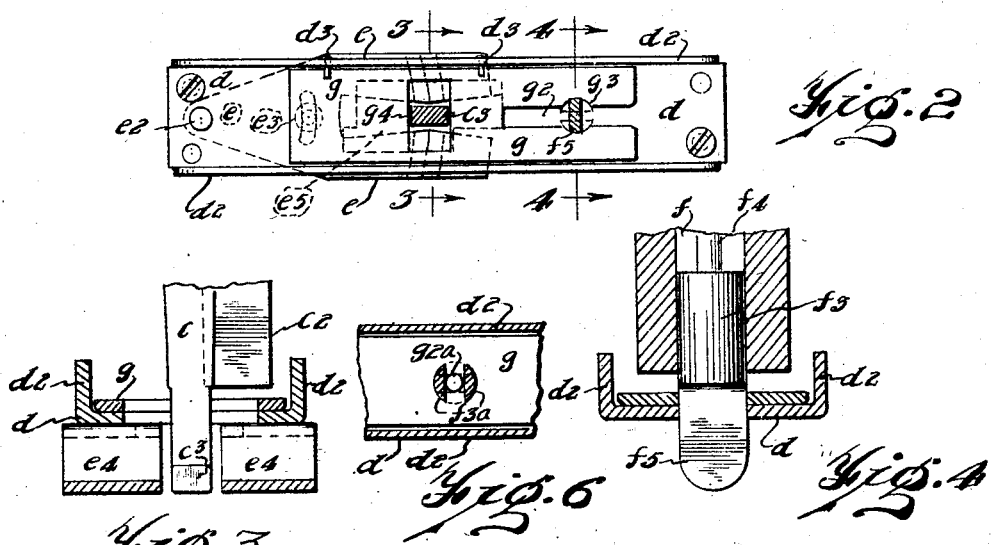
CHARLES G. TROSIEN
INVENTOR.
BY
Raymond A. Parker
ATTORNEY.

Patented July 7, 1925.

1,545,218

UNITED STATES PATENT OFFICE.

CHARLES G. TROSIEN, OF PONTIAC, MICHIGAN.

AUTOMOBILE LOCK.

Application filed December 27, 1920. Serial No. 433,286.

*To all whom it may concern:*

Be it known that I, CHARLES G. TROSIEN, citizen of the United States, residing at Pontiac, county of Oakland, State of Michigan, have invented a certain new and useful Improvement in Automobile Locks, and declare the following to be a full, clear, and exact description of the same, such as will enable others skilled in the art to which it pertains to make and use the same, reference being had to the accompanying drawings, which form a part of this specification.

My invention relates to automobile locks and an object of my improvements is to provide a simple and strong apparatus for locking the actuating part of the change speed gearing. I secure this object in the device illustrated in the accompanying drawings, in which:

Figure 1 is a sectional elevation of the cover and a portion of the casing of a change speed gearing, the parts contained in the cover being shown in elevation and section, the parts contained in the casing being omitted as they are conventional and well known.

Fig. 2 is a plan view partly in section on the line 2—2 of Figure 1 of the contained portion of the apparatus of Fig. 1.

Fig. 3 is a section on the line 3—3 of Fig. 2.

Fig. 4 is a section on the line 4—4 of Fig. 2.

Fig. 5 is a detailed sectional view showing a modified construction.

Fig. 6 is a sectional detailed plan view on the line 6—6 of Fig. 5.

$a$ indicates the casing for the change speed gearing. $b$ is a cover therefor secured to said casing in the usual way. $c$ is an actuating lever for the reciprocating parts of the change speed gearing.

I have shown the parts of a change speed gearing well known as the Brown-Lipe change speed gearing.

$c^2$ is the characteristic bolt of this kind of gearing which is actuated when a reverse motion is required. The lever $c$ extends down into the casing $a$ at $c^3$ to selectively engage the different reciprocating parts.

$d$ is a rectangular plate secured across the opening in the casing $a$ within the cover $b$. This plate is provided with upwardly extending side flanges $d^2\ d^2$ along its side edges thus in effect forming a trough with its cavity open upward. $d^4$ is an aperture formed through the center of the plate $d$ to permit the motion of the actuating lever $c$. $e$ is an oscillating plate pivoted to the lower surface of the plate $d$ at $e^2$ and restrained and guided in its oscillating motion by a pin $e^3$ engaging in and over the edges of an arcuate slot as indicated most distinctly in Fig. 2. $e^4\ e^4$ are lugs for engaging and locking the reciprocating parts of the change speed gear that are not in position to be actuated by the lever $c$.

The above noted parts are those of the well known construction referred to.

To provide a cheap easily assembled and strong locking apparatus I provide a plate $g$ of a width adapted to fit between the flanges $d^2\ d^2$ and lie upon the upper surface of the plate $d$. Through the center of the plate $g$ is a rectangular aperture $g^4$ of a shape and size that shall permit the lateral movement of the lever $c$ which extends through said aperture but shall prevent relative motion between said plate and lever longitudinally of said plate and of the plate $d$. $g^2$ is a narrow rectangular slot cut in from one end of the plate $g$ and having an enlargement $g^3$ intermediate its ends. $f^5$ is a cam extending into the slot $g^2$ and adapted to be turned in the enlargement of said slot as shown in full lines of Fig. 2 to lock the plate $g$ from longitudinal motion or to be turned in the position indicated by dotted lines in said figure so that the plate $g$ shall be free to reciprocate in the direction of its length.

$h$ is a cylindrical aperture in the cover $b$, its axis extending vertically above the center of the slot $g^2$ and its walls extending downwardly to a point adjacent to the plate $g$. $f^3$ is a cylindrical piece integral with, or rigidly connected to, the cam $f^5$ and adapted to turn in the lower end of the aperture $h$. $f^2$ is the cylinder of a pin-lock which fits and is adapted to turn in the upper end of the aperture $h$. $f^4$ is a rod co-axial with and joining the parts $f^2$ and $f^3$.

A key may be inserted in the slot of the cylinder $f^2$ and the cam $f^5$ thereby turned to its locking or unlock position.

The operation of the above described device is as follows:

When the cam $f^5$ is turned to the position indicated by dotted lines in Fig. 2 the actuating lever $c$ is free to move in the usual way, the lever engaging against the edges of the aperture $g^4$ and moving the plate $g$ longitudinally with said lever. When the lever $c$ is returned to neutral position as indicated in Fig. 2, the enlargement $g^3$ of the slot $g^2$ is adjacent to the cam $f^5$ and said cam may be turned to the position indicated in full lines in Fig. 2 which will prevent the longitudinal reciprocation of the plate $g$ and thus prevent the movement in this direction of the end of the lever $c$ engaging within the slot $g^4$ so that said lever is held in neutral position and is locked to prevent unauthorized use of the apparatus.

Instead of the slot $g^2$ a lug $g^{2a}$ (Figs. 5 and 6) may be secured to the plate $g$ and extend upward therefrom. A pair of engaging cams $f^{3a}$ may replace the cam which may be turned so that they shall engage the lug $g^{2a}$ to prevent the longitudinal movement of the plate $g$ from the locked position of said plate as shown in full lines in Figs. 5 and 6 or these cams may be turned to the position indicated in dotted lines in Fig. 6 at which position the lug $g^{2a}$ will be unobstructed as to its movement with the plate $g$ and the gear actuating parts will be released.

Claims:

1. The combination with a commercial change speed gearing including a flanged plate and an operating lever, of an integral plate formed to rest on and be supported and guided by the flanged plate, the integral plate having a single opening of a width to permit lateral shift of the operating lever received therein, and adapted to be moved longitudinally of the flanged plate upon operation of the lever in a gear shifting movement, and means for locking the plate against longitudinal movement.

2. The combination with a commercial change speed gearing including a flanged plate and an operating lever, of an integral plate formed to rest on and be supported and guided by the flanged plate, the integral plate having a single opening of a width to permit lateral shift of the operating lever received therein and of a length to prevent independent longitudinal movement of the lever, the plate being adapted to be moved longitudinally of the flanged plate upon operation of the lever in a gear shifting movement, and means for locking the plate against longitudinal movement.

3. In a change speed gearing, the combination of a longitudinally shiftable locking plate consisting of an integral member having an aperture therein, an operating lever always engaging in said aperture and adapted to shift the gearing by a longitudinal movement and to select the gearing by a lateral movement, said aperture being of a width to permit relative lateral shifting of said lever and of a length to prevent relative longitudinal movement of the lever and a releasable means of locking said plate against longitudinal movement.

In testimony whereof, I sign this specification.

CHARLES G. TROSIEN.